Figure 1:
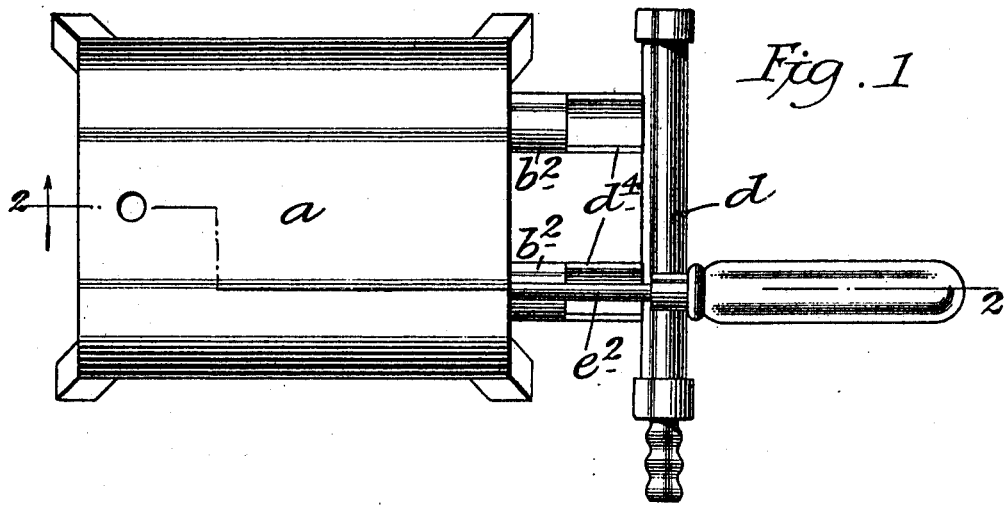

P. BURGER & B. SAKREN.
SOLDERING IRON HEATER.
APPLICATION FILED AUG. 15, 1910.

980,059.

Patented Dec. 27, 1910.

Witnesses:
A. L. Appleman
B. M. Ryerson.

Pincus Burger
Benjamin Sakren.
Inventors

By his Attorneys Edgar Tate & Co.

UNITED STATES PATENT OFFICE.

PINCUS BURGER AND BENJAMIN SAKREN, OF NEW YORK, N. Y.

SOLDERING-IRON HEATER.

980,059.    Specification of Letters Patent.    Patented Dec. 27, 1910.

Application filed August 15, 1910.   Serial No. 577,333.

*To all whom it may concern:*

Be it known that we, PINCUS BURGER and BENJAMIN SAKREN, citizens of the United States, and residing at New York, in the county of New York and State of New York, have invented certain new and useful Improvements in Soldering-Iron Heaters, of which the following is a specification, such as will enable those skilled in the art to which it appertains to make and use the same.

This invention relates to soldering iron heaters, and the object thereof is to provide a device of this class adapted to heat two or more soldering irons at the same time, and employing gas as a heating medium, with means whereby when one of the soldering irons is removed from the heater for use the supply of gas to the corresponding burner will be cut off automatically, and will be automatically lighted when the soldering iron is again placed in the heater.

The invention is fully disclosed in the following specification, of which the accompanying drawing forms a part, in which the separate parts of our improvement are designated by suitable reference characters in each of the views, and in which:—

Figure 2:
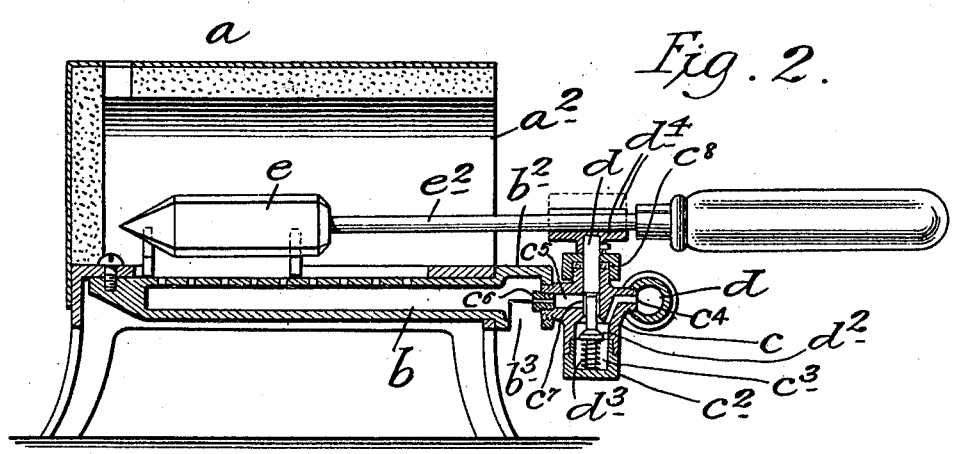

Figure 1 is a plan view of a soldering iron heater involving our invention and showing one soldering iron in position to be heated; and, Fig. 2 a section on the line 2—2 of Fig. 1.

In the practice of our invention, we provide a heater of the class specified, comprising a furnace casing $a$ of the usual form, and in the bottom of which are parallel gas burner tubes $b$. The furnace casing $a$ is open at its front end as shown at $a^2$ and the ends of the burner tubes $b$ project slightly at said end, as shown at $b^2$, and are provided in the bottom thereof with air inlets $b^3$, and connected with the projecting ends of said burner tubes are valve couplings $c$ with which are connected a transverse gas supply pipe $d$. The couplings $c$ are provided at the bottom thereof with detachable screw-threaded caps $c^2$ forming at the bottom of said couplings and in connection with recesses formed therein, chambers $c^3$, and said couplings are also provided with angular ports $c^4$ which form a communication between the chambers $c^3$ and the gas supply pipe $d$, and on the opposite sides thereof with discharge ports $c^5$ having nozzles $c^6$ which communicate with the tops of the chambers $c^3$ by means of vertically arranged passages $c^7$ which form parts of said ports, and which extend from said chambers $c^3$ upwardly through said couplings.

At the top of the couplings $c$ are stuffing boxes $c^8$ and movable vertically through said couplings and through said passages $c^7$ and through said stuffing boxes are valve stems $d$ provided within the chambers $c^3$ with valves $d^2$ below which are placed springs $d^3$, this construction being clearly shown in Fig. 2, and the valve stems $d^2$ are provided at their upper ends with supports $d^4$ on which, when the soldering irons $e$ are being heated, the handle rods $e^2$ thereof rest, and when said soldering irons are placed in position to be heated as shown in Fig. 2, the handle rods $e^2$ thereof rest on the supports $d^4$ and depress the valve stems $d$ and valves $d^2$, and this allows the gas to pass freely through the couplings $c$ to the burner tubes $b$.

The vertically arranged passages $c^7$ between the chambers $c^3$ and ports $c^5$ are larger than that part of the rod $d$ which passes therethrough, and this permits the passage of gas from the chamber $c^3$ to the ports $c^5$. The caps $c^2$ are made detachable in order to permit of the cleaning of the chambers $c^3$ and the valves $d^2$ and for changing the springs $d^3$ when necessary.

In the accompanying drawing two of the burner tubes $b$ and corresponding valve couplings $c$ are employed, but our invention is not limited to this number of burner tubes.

With our improvement, as will be seen, when one of the soldering irons is removed for use, the flow of gas to the corresponding burner tube is automatically cut off, while the remaining burner tube may remain in use for the purpose of heating another soldering iron, and when the first named soldering iron is returned to the heater, the corresponding gas supply valve will be open and the gas will flow to the corresponding burner tube $b$, and the said gas escaping from said tube will be ignited by the adjacent burner tube.

With this construction, there will be no loss of gas and no necessity for turning off the gas by hand at any time, this operation being automatically performed, and as the result thereof a large saving of gas will be effected, and the operation of the heater rendered practical and efficient.

Having fully described our invention, what we claim as new and desire to secure by Letters Patent, is:—

1. A soldering iron heater provided with a plurality of gas burner tubes and adapted to hold a plurality of irons at the same time, said burner tubes being open at one end and provided with gas supply couplings, and a gas supply tube communicating with the said couplings, said couplings being provided at the top thereof with stuffing boxes and at the bottom thereof with detachable caps forming chambers in the bottom of said couplings, said couplings being also provided with ports which communicate with said chambers and with said gas supply tube and with discharge ports which communicate with said burner tubes and with vertical passages which extend from said chambers upwardly therethrough, and which communicate with said discharge ports, and vertically movable valve stems mounted in said couplings and extending from said chambers upwardly therethrough and through said stuffing boxes and provided at their upper ends with supports, said valve stems being provided within said chambers with valves adapted to close the communications with said discharge ports and with springs which normally force said valve stems upwardly.

2. A soldering iron heater provided with a gas burner tube, said burner tube being open at one end and provided with a gas supply coupling, and a gas supply pipe connected with said coupling, said coupling being provided at the top thereof with a stuffing box and at the bottom thereof with a chamber closed by a detachable cap and said coupling being also provided with a port forming a communication between said chamber and the supply pipe and with a discharge port forming a communication between said chamber and the burner tube, and said coupling being also provided with a vertically arranged passage which extends upwardly therethrough from said chamber and which forms a part of the discharge port, and a vertically movable valve stem mounted in said coupling and extending from said chamber upwardly therethrough and provided at its upper end with a support and within said chamber with a valve and below said valve with a spring which normally serves to force said valve stem and valve upwardly.

In testimony that we claim the foregoing as our invention we have signed our names in presence of the subscribing witnesses this 13th day of August 1910.

PINCUS BURGER.
BENJAMIN SAKREN.

Witnesses:
C. E. MULREANY,
B. M. RYERSON.